(12) United States Patent
Liu et al.

(10) Patent No.: US 12,719,060 B2
(45) **Date of Patent: *Aug. 25, 2026**

(54) NEGATIVE ELECTRODE CURRENT COLLECTOR, NEGATIVE ELECTRODE PLATE, ELECTROCHEMICAL DEVICE, AND APPARATUS

(71) Applicant: CONTEMPORARY AMPEREX TECHNOLOGY (HONG KONG) LIMITED, Hong Kong (CN)

(72) Inventors: Xin Liu, Ningde City (CN); Shiwen Wang, Ningde City (CN); Qisen Huang, Ningde City (CN); Cheng Li, Ningde City (CN); Mingling Li, Ningde City (CN); Jia Peng, Ningde City (CN); Xianghui Liu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 585 days.

This patent is subject to a terminal disclaimer.

(21) Appl. No.: 17/535,690

(22) Filed: Nov. 26, 2021

(65) Prior Publication Data

US 2022/0085383 A1 Mar. 17, 2022

Related U.S. Application Data

(63) Continuation of application No. PCT/CN2019/125148, filed on Dec. 13, 2019.

(30) Foreign Application Priority Data

May 31, 2019 (CN) ........................ 201910469957.3

(51) Int. Cl.
*H01M 4/66* (2006.01)
*H01M 4/02* (2006.01)

(52) U.S. Cl.
CPC ............. *H01M 4/667* (2013.01); *H01M 4/66* (2013.01); *H01M 4/661* (2013.01); *H01M 4/662* (2013.01);
(Continued)

(58) Field of Classification Search
CPC ......... H01M 10/05–0525; H01M 4/36; H01M 4/64–668; H01M 4/02
See application file for complete search history.

(56) References Cited

U.S. PATENT DOCUMENTS 6,235,427 B1 5/2001 Idota et al.
10,910,652 B2 * 2/2021 Liang .................... H01M 4/664
(Continued)

FOREIGN PATENT DOCUMENTS

CN 1591932 A 3/2005
CN 101207186 A 6/2008
(Continued)

OTHER PUBLICATIONS

Machine translation of Qiu, CN 106981665. Originally available Jul. 25, 2017. (Year: 2017).*
(Continued)

*Primary Examiner* — Nicole M. Buie-Hatcher
*Assistant Examiner* — Jacob Buchanan
(74) *Attorney, Agent, or Firm* — East IP P.C.

(57) ABSTRACT

The present application discloses a negative electrode current collector, a negative electrode plate, and an electrochemical device. The negative electrode current collector includes an organic support layer and a copper-based conductive layer disposed on at least one surface of the organic support layer; wherein a thickness $D_1$ of the copper-based
(Continued)

conductive layer, a tensile strength T of the organic support layer, and a thickness $D_2$ of the organic support layer satisfy a relational formula $0.01 \leq (300 \times D_1)/(T \times D_2) \leq 0.5$. The negative electrode current collector has relatively high mechanics and mechanical properties, good electrical conductivity and current collection performance, which can improve preparation yield of the negative electrode current collector, the negative electrode plate and the electrochemical device and their reliability during use, and is beneficial to enabling the electrochemical device to have relatively high electrochemical performance and relatively high gravimetric energy density.

13 Claims, 4 Drawing Sheets

(52) U.S. Cl.
CPC .......... *H01M 4/663* (2013.01); *H01M 4/668* (2013.01); *H01M 2004/021* (2013.01); *H01M 2004/027* (2013.01)

(56) References Cited

U.S. PATENT DOCUMENTS 11,177,479 B2 * 11/2021 Liang .................... H01M 4/668
12,051,811 B2 7/2024 Li et al.
12,148,932 B2 11/2024 Li et al.
2004/0126663 A1 * 7/2004 Sudano ............... H01M 10/052 429/234
2005/0221190 A1 10/2005 Sudano et al.
2008/0118830 A1 * 5/2008 Lee .................... H01M 50/121 429/163
2011/0111294 A1 5/2011 Lopez et al.
2011/0287322 A1 11/2011 Moon et al.
2013/0115510 A1 5/2013 Tani et al.
2015/0303450 A1 10/2015 Miki et al.
2016/0276653 A1 9/2016 Seki et al.
2018/0301709 A1 * 10/2018 Qiu ........................ C23C 14/30
2019/0173090 A1 6/2019 Liang et al.
2019/0305299 A1 10/2019 Zhang et al.
2019/0363344 A1 11/2019 Shen et al.
2021/0075003 A1 3/2021 Yasuda et al.
2022/0085384 A1 * 3/2022 Liu ....................... H01M 4/667
2022/0209226 A1 * 6/2022 Li ......................... H01M 4/667
2024/0113288 A1 4/2024 Li et al.

FOREIGN PATENT DOCUMENTS

CN 103384012 A 11/2013
CN 103429628 A 12/2013
CN 103907226 A 7/2014
CN 204088469 U 1/2015
CN 105845978 A 8/2016
CN 106654285 A 5/2017
CN 106711462 A 5/2017
CN 106910897 A 6/2017
CN 106981665 A * 7/2017 ........... H01M 4/667
CN 107123812 A 9/2017
CN 107221676 A 9/2017
CN 206849947 U 1/2018
CN 108155387 A 6/2018
CN 108281662 A 7/2018
CN 108832134 A 11/2018
CN 108844878 A 11/2018
CN 109216703 A 1/2019
CN 109461880 A 3/2019
CN 109830688 A 5/2019
CN 109873164 A 6/2019
CN 109873166 A 6/2019
CN 110890531 A 3/2020
CN 110943222 A 3/2020
CN 110943227 A 3/2020
EP 2924772 A1 9/2015
EP 3346522 A1 7/2018
EP 3496190 A1 6/2019
EP 3624240 A1 3/2020
EP 3951956 A1 2/2022
JP 09-120818 A 5/1997
JP 11-149008 A 6/1999
JP 2001297633 A 10/2001
JP 2002059362 A 2/2002
JP 2004103475 A 4/2004
JP 2004273132 A 9/2004
JP 2005100959 A 4/2005
JP 2006012998 A 1/2006
JP 2006512722 A 4/2006
JP 2007217598 A 8/2007
JP 2008140552 A 6/2008
JP 2011068727 A 4/2011
JP 2011079284 A 4/2011
JP 2015185407 A 10/2015
JP 2016121308 A 7/2016
JP 2018181823 A 11/2018
JP 2019102429 A 6/2019
JP 2020047577 A 3/2020
KR 100669338 B1 1/2007
KR 20120019568 A 3/2012
WO WO2009157263 A1 12/2009
WO WO2012127561 A1 9/2012
WO WO2018179111 A1 10/2018

OTHER PUBLICATIONS

The International search report for PCT Application No. PCT/CN2019/125148, dated Mar. 16, 2020, 14 pages.
The First Office Action for China Application No. 201910469957.3, dated Oct. 26, 2020, 9 pages.
The First Office Action for Chinese Application No. 202110560987.2, dated Oct. 25, 2023, 10 pages.
The Non-final Office Action for U.S. Appl. No. 17/536,103, dated Dec. 20, 2023, 20 pages.
The Extended European Search Report for European Application No. 19930724.0, dated May 10, 2020, 7 pages.
The Third Party Observations for Japanese Application No. 2021-556889, dated Sep. 20, 2022, 15 pages.
The Extended European Search Report for European Application No. 19930524.4, dated May 10, 2020, 8 pages.
The First Office Action for Chinese Application No. 201910471353.2, dated Oct. 10, 2020, 14 pages.
The Notice of Allowance for Chinese Application No. 201910471353.2, dated Mar. 29, 2021, 6 pages.
The First Office Action for Japanese Application No. 2021-556478, dated Oct. 3, 2022, 7 pages.
The International Search Report for PCT Application No. PCT/CN2019/125149, dated Mar. 12, 2020, 21 pages.
The First Office Action for Chinese Application No. 201910472007.6, dated Aug. 20, 2020, 16 pages.
The Second Office Action for Chinese Application No. 201910472007.6, dated Nov. 10, 2020, 16 pages.
The Notice of Allowance for Chinese Application No. 201910472007.6, dated Feb. 2, 2021, 6 pages.
The Extended European Search Report for European Application No. 19931131.7, dated Jul. 26, 2022, 8 pages.
The First Office Action for Indian Application No. 202117056343, dated Mar. 30, 2022, 7 pages.
The International Search Report for PCT Application No. PCT/CN2019/090412, dated Mar. 4, 2020, 15 pages.
The First Office Action for Japanese Application No. 2021-556889, dated Nov. 8, 2022, 9 pages.
The First Office Action for European Application No. 19930524.4, dated Jan. 3, 2023, 4 pages.
The First Office Action for European Application No. 19930724.0, dated Jan. 4, 2023, 7 pages.
The First Office Action for Japanese Application No. 2021-564148, dated Nov. 15, 2022, 7 pages.

(56) References Cited

OTHER PUBLICATIONS

The International search report for PCT Application No. PCT/CN2020/085424, dated Jan. 18, 2021, 13 pages.
The extended European search report for European Application No. 20930756.0, dated Jul. 25, 2022, 7 pages.
The First Office Action for U.S. Appl. No. 17/697,930, dated Dec. 6, 2023, 24 pages.
The Non-final Office Action for U.S. Appl. No. 17/537,520, dated Sep. 28, 2024, 37 pages.
The Final Office Action after 1st RCE for U.S. Appl. No. 17/697,930, dated Nov. 6, 2024, 16 pages.
The First Office Action for CN Application No. 202311325779.X, dated Aug. 23, 2025, 16 pages.
The Non-final Office Action after 2nd-RCE for U.S. Appl. No. 17/536,103, dated May 28, 2025, 26 pages.
The 2nd-Non-final Office Action after 2nd-RCE for U.S. Appl. No. 17/536,103, dated Sep. 16, 2025, 25 pages.

* cited by examiner

NEGATIVE ELECTRODE CURRENT COLLECTOR, NEGATIVE ELECTRODE PLATE, ELECTROCHEMICAL DEVICE, AND APPARATUS

CROSS-REFERENCE TO RELATED APPLICATION

This application is a continuation of International Application No. PCT/CN2019/125148, filed on Dec. 13, 2019, which claims priority to Chinese Patent Application No. 201910469957.3 entitled "Negative Electrode Current Collector, Negative Electrode Plate and Electrochemical Device" and filed on May 31, 2019, both of which are incorporated herein by reference in their entireties.

TECHNICAL FIELD

This application belongs to the technical field of electrochemical devices, and specifically relates to a negative electrode current collector, a negative electrode plate, an electrochemical device, and an apparatus.

BACKGROUND

Electrochemical devices represented by lithium-ion secondary batteries have relatively high charge and discharge performance and environmental friendliness, and therefore, have been widely used in electric vehicles and consumer electronic products. Current collectors are important parts of the electrochemical devices. They not only provide support for active material layers, but also collect current generated by the active material layers for external output. Therefore, the current collectors have an important influence on the performance of electrode plates and electrochemical devices.

Therefore, negative electrode current collectors with excellent performance are still required.

SUMMARY

In the first aspect, the present application provides a negative electrode current collector, including a polymer material-based support layer and a copper-based conductive layer disposed on at least one surface of the support layer; wherein a thickness $D_1$ of the copper-based conductive layer, a tensile strength T of the support layer, and a thickness $D_2$ of the support layer satisfy a relational formula 1 below, $$0.01 \leq (300 \times D_1)/(T \times D_2) \leq 0.5 \quad \text{formula 1}$$

in the formula 1, $D_1$ and $D_2$ are in the same unit, and T is in MPa.

In the second aspect, the present application provides a negative electrode plate, including a negative electrode current collector and a negative electrode active material layer disposed on the negative electrode current collector, wherein the negative electrode current collector is the negative electrode current collector according to the first aspect of the present application.

In the third aspect, the present application provides an electrochemical device, including a positive electrode plate, a negative electrode plate and an electrolyte, wherein the negative electrode plate is the negative electrode plate according to the second aspect of the present application.

In the fourth aspect, the present application provides an apparatus, including the electrochemical device according to the third aspect of the present application.

The negative electrode current collector provided by the present application includes a polymer material-based support layer and a copper-based conductive layer disposed on the support layer, and the thickness $D_1$ of the copper-based conductive layer, the tensile strength T of the support layer, and the thickness $D_2$ of the support layer satisfy the relational formula 1. It is surprisingly found that the negative electrode current collector has appropriate toughness and good electrical conductivity and current collecting performance. The appropriate toughness ensures that the negative electrode current collector has relatively high mechanics and mechanical properties, so that the negative electrode current collector can withstand certain deformation without breakage during the production and working process of the electrochemical device. This improves the machining property of the negative electrode current collector and its stability during use, which can effectively prevent it from breaking or cracking during subsequent machining and use, thereby significantly improving yields of the negative electrode current collectors and the negative electrode plates and electrochemical devices using the same during preparation and their reliability during use. By using the negative electrode current collector with good electrical conductivity and current collecting performance, the electrochemical device has relatively high electrochemical performance. In addition, the negative electrode current collector provided by the present application can also increase gravimetric energy density of the electrochemical device.

The apparatus of the present application includes the electrochemical device provided by the present application, and thus has at least the same advantages as the electrochemical device.

DESCRIPTION OF THE DRAWINGS

In order to explain the technical solutions of the embodiments of the present application more clearly, the following will briefly introduce the drawings that need to be used in the embodiments of the present application. A person of ordinary skill in the art can obtain other drawings based on the drawings without creative work.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Electrode Current Collector

Figure 1:
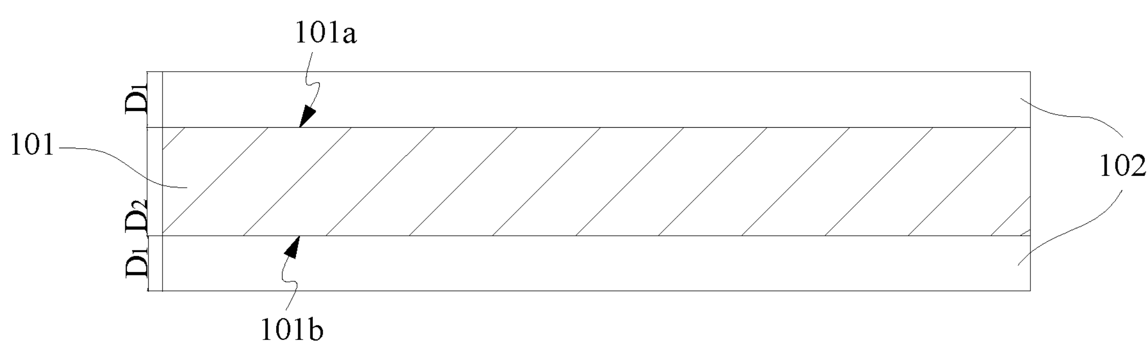
FIG. 1 is a schematic structural diagram of a negative electrode current collector according to an embodiment of the present application.

The first aspect of the present application provides a negative electrode current collector 10. FIG. 1 is a schematic structural diagram of a negative electrode current collector 10 as an example. Referring to FIG. 1, the negative electrode current collector 10 includes a polymer material-based support layer 101 and a copper-based conductive layer 102 that are laminated. The support layer 101 has a first surface 101*a* and a second surface 101*b* opposite in its thickness direction, and the copper-based conductive layer 102 is disposed on the first surface 101*a* and the second surface 101*b* of the support layer 101.

It is understandable that the copper-based conductive layer 102 may also be disposed on either of the first surface 101*a* and the second surface 101*b* of the support layer 101. For example, the copper-based conductive layer 102 is disposed on the first surface 101*a* of the support layer 101. Apparently, the copper-based conductive layer 102 may also be disposed on the second surface 101*b* of the support layer 101.

For convenience, a brittleness parameter C of the negative electrode current collector 10 is defined as:

$$C=(300\times D_1)/(T\times D_2) \quad \text{formula 1}$$

wherein, 300 is a coefficient, $D_1$ is a thickness of the copper-based conductive layer 102, T is a tensile strength of the support layer 101, $D_2$ is a thickness of the support layer 101, $D_1$ and $D_2$ are in the same unit, and T is in MPa.

The brittleness parameter C of the negative electrode current collector 10 satisfies: $0.01\leq C\leq 0.5$.

The formula 1 is applicable to the negative electrode current collector 10 where the copper-based conductive layer 102 is disposed on at least one surface of the support layer 101, more applicable to the negative electrode current collector 10 where the copper-based conductive layer 102 is respectively disposed on two opposite surfaces of the support layer 101, and especially applicable to the negative electrode current collector 10 where the copper-based conductive layer 102 is respectively disposed on two opposite surfaces of the support layer 101 and the copper-based conductive layers 102 on both sides have equal or substantially equal thickness. The aforementioned substantially equal means that the copper-based conductive layers 102 on both sides have a thickness difference of not more than 10%, for example, not more than 10%, 9%, 8%, 7%, 6%, 5%, 3%, 2%, or 1%.

In some embodiments, the "thickness $D_1$ of the copper-based conductive layer 102" refers to the thickness of the copper-based conductive layer 102 on a single side of the support layer 101.

In some other embodiments, the "thickness $D_1$ of the copper-based conductive layer 102" refers to an average thickness of the copper-based conductive layers 102 on both sides of the support layer 101, that is, half of a sum of thicknesses of the copper-based conductive layers 102 on both sides of the support layer 101.

For example, for the negative electrode current collector 10 where the copper-based conductive layer 102 is disposed on a single side of the support layer 101, the "thickness $D_1$ of the copper-based conductive layer 102" refers to the thickness of the copper-based conductive layer 102 on the single side of the support layer 101. For the negative electrode current collector 10 where the copper-based conductive layer 102 is respectively disposed on two opposite surfaces of the support layer 101 and the copper-based conductive layers 102 on both sides have equal or substantially equal thickness, the "thickness $D_1$ of the copper-based conductive layer 102" refers to the thickness of the copper-based conductive layer 102 on the single side of the support layer 101 or the average thickness of the copper-based conductive layers 102 on both sides of the support layer 101. For the negative electrode current collector 10 where the copper-based conductive layer 102 is respectively disposed on two opposite surfaces of the support layer 101 and the copper-based conductive layers 102 on both sides have a thickness difference of more than 10%, the "thickness $D_1$ of the copper-based conductive layer 102" refers to the average thickness of the copper-based conductive layers 102 on both sides of the support layer 101. This can better apply the formula 1.

The tensile strength T of the support layer 101 can be measured by instruments and methods well-known in the art, for example, measured by means of American INSTRON 3365 universal tensile tester. An exemplary measurement method is as follows: cutting the support layer 101 into a strip sample, such as a sample with a width of 15 mm and a length of 150 mm, which is then loaded the sample into two opposite clamps of the universal tensile tester with an initial length set to 50 mm; performing a tensile test at a tensile rate of 5 mm/min until the sample breaks; and recording maximum tensile force F borne when the sample breaks to calculate the tensile strength T of the support layer 101 according to T=F/S, where S is initial cross-sectional area of the sample. S can be calculated by the product of the width and thickness of the sample. The thickness of the sample is the thickness $D_2$ of the support layer 101.

The thickness $D_1$ of the copper-based conductive layer 102 and the thickness $D_2$ of the support layer 101 can be measured by instruments and methods known in the art, for example, by a ten-thousandth micrometer.

The negative electrode current collector 10 includes a polymer material-based support layer 101 and a copper-based conductive layer 102 disposed on the support layer 101, and the brittleness parameter C of the negative electrode current collector 10 satisfies $0.01 \leq C \leq 0.5$. Therefore, the negative electrode current collector 10 has appropriate toughness, which ensures that the negative electrode current collector 10 has relatively high mechanics and mechanical properties. The negative electrode current collector 10 can withstand certain deformation without breakage during the production and working process of an electrochemical device, which is beneficial to improving the machining property of the negative electrode current collector 10 and its stability during use, and effectively prevents it from breaking or cracking during its preparation and use. Therefore, the present application can significantly improve yields of the negative electrode current collector 10 and the negative electrode plate and electrochemical device using the same during preparation and their reliability during use.

The negative electrode current collector 10 is not prone to breaking and cracking during the production and working process of the electrochemical device, which ensures electrical conductivity and current collecting performance of the negative electrode current collector 10, prevents the negative electrode active material layer from breaking or cracking, and maintains the continuity of its internal conductive network to ensure effective performance of the negative electrode active material layer. Using of the negative electrode current collector 10 of the present application is beneficial to prolonging the service life of the electrochemical device.

The brittleness parameter C of the negative electrode current collector 10 is within the above range, which also ensures that the negative electrode current collector 10 has good electrical conductivity and current collecting performance. This is beneficial to enabling the negative electrode plate and the electrochemical device to have low impedance, and reducing polarization of the electrochemical device, so that the electrochemical device has relatively high electrochemical performance, and the electrochemical device has relatively high rate performance and cycle performance.

In addition, because the density of the support layer 101 is smaller than that of a metal, the negative electrode current collector 10 of the present application can also reduce weight of the electrochemical device, thereby further improving the energy density of the electrochemical device.

In some embodiments, the brittleness parameter C of the negative electrode current collector 10 may be ≤0.5, ≤0.48, ≤0.45, ≤0.42, ≤0.4, ≤0.38, ≤0.36, ≤0.35, ≤0.32, ≤0.3, ≤0.28 or ≤0.25, and further may be ≥0.01, ≥0.05, ≥0.08, ≥0.1, ≥0.12, ≥0.15, ≥0.17, ≥0.19, ≥0.2 or ≥0.22.

The inventors of the present application found that, by making the brittleness parameter C of the negative electrode current collector 10 within an appropriate range, the energy density of the electrochemical device can be better improved, while the negative electrode current collector 10 and the negative electrode plate have relatively high current carrying capacity. The electrochemical device using the negative electrode current collector 10 has relatively good comprehensive performance. Preferably, the brittleness parameter C of the negative electrode current collector 10 is from 0.1 to 0.3. The negative electrode current collector 10 can better exert the above-mentioned effects.

In some embodiments, the thickness $D_1$ of the copper-based conductive layer 102 is preferably 30 nm≤D1≤3 μm. For example, the thickness $D_1$ of the copper-based conductive layer 102 may be ≤3 μm, ≤2.5 μm, ≤2 μm, ≤1.8 μm, ≤1.5 μm, ≤1.2 μm, ≤1 μm, ≤900 nm, ≤750 nm, ≤450 nm, ≤250 nm or ≤100 nm, and further may be ≥30 nm, ≥80 nm, ≥100 nm, ≥150 nm, ≥300 nm, ≥400 nm, ≥600 nm, ≥800 nm, ≥1 μm or ≥1.6 μm.

The relatively thin copper-based conductive layer 102 is disposed on the surface of the support layer 101, which can significantly reduce the weight of the negative electrode current collector 10 as compared to existing metal current collectors (such as a copper foil), thereby reducing the weight of the electrochemical device and significantly increasing the energy density of the electrochemical device.

In addition, the thickness $D_1$ of the copper-based conductive layer 102 is suitable for enabling the copper-based conductive layer 102 to have relatively high electrical conductivity, thereby enabling the negative electrode current collector 10 to have relatively high electrical conductivity and current collecting performance, thereby improving the performance of the electrochemical device, and preventing lithium precipitation at a negative electrode. Moreover, the copper-based conductive layer 102 is not prone to breaking during processing and use, so that the negative electrode current collector 10 has relatively high breaking toughness and relatively good mechanical stability and working stability.

Preferably, 300 nm≤$D_1$≤2 μm. More preferably, 500 nm≤$D_1$≤1.5 μm. Especially preferably, 800 nm≤$D_1$≤1.2 μm.

In some embodiments, the copper-based conductive layer 102 may include one or more of copper and copper alloy. Mass percentage content of a copper element in the copper alloy is preferably 80 wt % or more, and more preferably 90 wt % or more.

In some embodiments, the tensile strength T of the support layer 101 is preferably 100 MPa≤T≤400 MPa, and more preferably 150 MPa≤T≤300 MPa. The tensile strength of the support layer 101 within a proper range is beneficial to enabling the negative electrode current collector 10 to have relatively high mechanics properties, so that the negative electrode current collector 10 is not prone to breaking or cracking. In addition, the support layer 101 will not be excessively extended or deformed, thereby further preventing the copper-based conductive layer 102 from breaking or cracking, enabling relatively high bonding strength between the support layer 101 and the copper-based conductive layer 102, and reducing the peeling of the copper-based conductive layer 102. Therefore, using the negative electrode current collector 10 is beneficial to improving the service life and cycle performance of the electrochemical device.

The proper tensile strength T is also suitable for better supporting the copper-based conductive layer 102 by the support layer 101.

In some embodiments, the support layer 101 has a Young's modulus E≥2 Gpa. The support layer 101 has rigidity, so that it can better support the copper-based conductive layer 102 to ensure the overall strength of the negative electrode current collector 10. In addition, the support layer 101 will not be excessively extended or deformed during the processing of the negative electrode current collector 10, which further prevents the support layer 101 and the copper-based conductive layer 102 from breaking, and enabling higher bonding strength between the support layer 101 and the copper-based conductive layer 102 without peeling. Therefore, the mechanical stability and working stability of the negative electrode current collector 10 are improved, thereby improving the performance of the electrochemical device, such as improving cycle life.

Preferably, the Young's modulus E of the support layer 101 satisfies 2 GPa≤E≤20 GPa. For example, E is 2 GPa, 3 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa. This enables the support layer 101 to have appropriate rigidity and appropriate toughness, and ensures winding flexibility of the support layer 101 and the negative electrode current collector 10 using the support layer 101 during processing.

The Young's modulus E of the support layer 101 can be measured by instruments and methods known in the art. For example, the Young's modulus E is measured by means of American INSTRON 3365 universal tensile tester. As an example, the support layer 101 is cut into a 15 mm×200 mm sample, thickness h (μm) of the sample is measured with a ten-thousandth micrometer, a tensile test is performed with the tensile tester at normal temperature and pressure (25° C., 0.1 MPa), an initial position is set such that the sample between the clamps is 50 mm long, the sample is stretched at a speed of 5 mm/min, load L (N) from stretching to break and device displacement y (mm) are recorded, then stress c (GPa)=L/(15×h), strain η=y/50, a stress-strain curve is drawn, and the curve of an initial linear region is selected, wherein the slope of this curve is the Young's modulus E.

In some embodiments, the thickness $D_2$ of the support layer 101 satisfies 1 μm≤$D_2$≤30 μm. The thickness $D_2$ of the support layer 101 enables it to have relatively high mechanical strength, not easy to break during processing and use, and to well support and protect the copper-based conductive layer 102, thereby improving the mechanical stability and working stability of the negative electrode current collector 10. Meanwhile, the thickness $D_2$ of the support layer 101 is small, which enables the electrochemical device to have relatively small size and relatively low weight, thereby increasing volumetric energy density and gravimetric energy density of the electrochemical device.

In some optional embodiments, the thickness $D_2$ of the support layer 101 may be ≤30 μm, ≤25 μm, ≤20 μm, ≤18 μm, ≤15 μm, ≤12 μm, ≤10 μm or ≤8 μm, and further may be ≥1, ≥1.5 μm, ≥2 μm, ≥3 μm, ≥4 μm, ≥5 μm, ≥6 μm, ≥7 μm, ≥9 μm or ≥16 μm. Preferably, 1 nm≤$D_2$≤20 μm. More preferably, 1 μm≤$D_2$≤15 μm. Especially preferably, 2 μm≤$D_2$≤10 μm. Particularly preferably, 2 μm≤$D_2$≤8 μm. Even preferably, 2 μm≤$D_2$≤6 μm.

The support layer 101 includes one or more of polymer materials. In some embodiments, the polymer materials may be selected from one or more of polyamides, polyimides, polyesters, polyolefins, polyynes, siloxane polymers, polyethers, polyols, polysulfones, polysaccharide polymers, amino acid polymers, polysulfur nitrides, aromatic ring polymers, aromatic heterocyclic polymers, epoxy resin, phenolic resin, derivatives thereof, cross linkers thereof, and copolymers thereof.

In some preferred embodiments, the polymer materials may include one or more of polycaprolactam (commonly known as nylon 6), polyhexamethylene adipamide (commonly known as nylon 66), polyparaphenylene terephthalamide (PPTA), polyisophthaloyl metaphenylene diamine (PMIA), polyethylene terephthalate (PET), polybutylene terephthalate (PBT), polyethylene naphthalate (PEN), polycarbonate (PC), polyethylene (PE), polypropylene (PP), polypropylene (PPE), polyvinyl alcohol (PVA), polystyrene (PS), polyvinyl chloride (PVC), polyvinylidene fluoride (PVDF), polytetrafluoroethylene (PTEE), poly(sodium styrene sulfonate) (PSS), polyacetylene, silicone rubber, polyoxymethylene (POM), polyphenylene ether (PPO), polyphenylene sulfide (PPS), polyethylene glycol (PEG), cellulose, starch, protein, polyphenylene, polypyrrole (PPy), polyaniline (PAN), polythiophene (PT), polypyridine (PPY), acrylonitrile-butadiene-styrene copolymer (ABS), derivatives thereof, cross linkers thereof, and copolymers thereof.

In some embodiments, the support layer 101 may further optionally include additives. The additives may include one or more of metallic materials and inorganic non metallic materials. The metal material additives may include one or more of aluminum, aluminum alloy, copper, copper alloy, nickel, nickel alloy, titanium, titanium alloy, iron, iron alloy, silver, and silver alloy. The inorganic non-metallic material additives may include one or more of carbon-based materials, alumina, silicon dioxide, silicon nitride, silicon carbide, boron nitride, silicate, and titanium oxide, and for another example, include one or more of glass materials, ceramics materials and ceramic composite materials. The carbon-based material additives are, for example, one or more of graphite, superconducting carbon, acetylene black, carbon black, Ketjen black, carbon dots, carbon nanotubes, graphene, and carbon nanofibers.

The additives may further include metal-coated carbon-based materials, such as one or more of nickel-coated graphite powder and nickel-coated carbon fibers.

In some preferred embodiments, the support layer 101 adopts one or more of insulating polymer materials and insulating polymer-based composite materials. The insulating polymer-based composite materials may include one or more of the above polymer materials and one or more of the above additives, and have electrical insulating property. The support layer 101 has a relatively high volume resistivity, which is beneficial to improving the safety performance of the electrochemical device.

Preferably, the support layer 101 may include one or more of polyethylene terephthalate (PET), polybutylene terephthalate (PBT), polyethylene naphthalate (PEN), poly(sodium styrene sulfonate) (PSS) and polyimide (PI).

In some embodiments, the support layer 101 may be of a single-layer structure, or a composite layer structure of two or more layers, such as two layers, three layers, or four layers.

Figure 2:
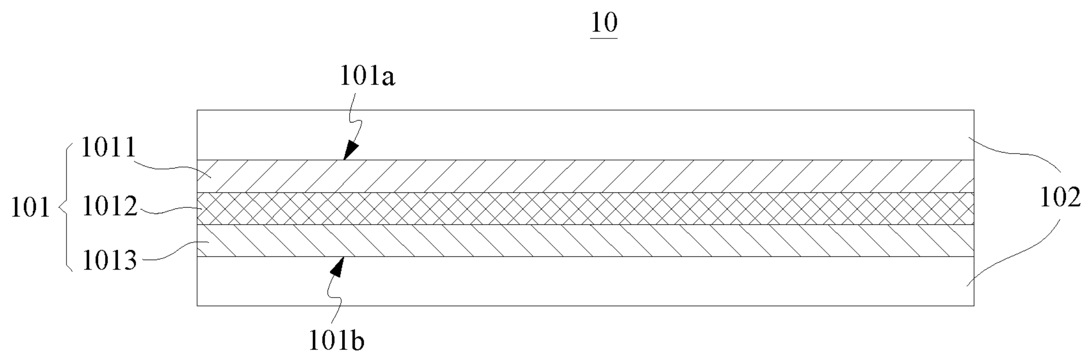
FIG. 2 is a schematic structural diagram of a negative electrode current collector according to another embodiment of the present application.

FIG. 2 is a schematic structural diagram of another negative electrode current collector 10 according to the present application. Referring to FIG. 2, the support layer 101 is of a composite layer structure formed by laminating a first sublayer 1011, a second sublayer 1012, and a third sublayer 1013. The support layer 101 of the composite layer structure has a first surface 101*a* and a second surface 101*b* opposite to each other, and the copper-based conductive layer 102 is laminated on the first surface 101*a* and the second surface 101*b* of the support layer 101. Apparently, the copper-based conductive layer 102 may be disposed only on the first surface 101*a* of the support layer 101, or only on the second surface 101*b* of the support layer 101.

When the support layer 101 is of a composite layer structure of two or more layers, materials of the sublayers may be the same or different.

The inventors' intensive research found that, especially when the thickness of the support layer 101 is not more than 10 μm, and more particularly not more than 8 μm, the brittleness parameter of the negative electrode current collector 10 is a more critical parameter for the mechanics and mechanical properties of the negative electrode current collector 10, which will affect the machining property, preparation yield, use reliability, etc. of the negative electrode current collector 10 to a greater extent.

Figure 3:
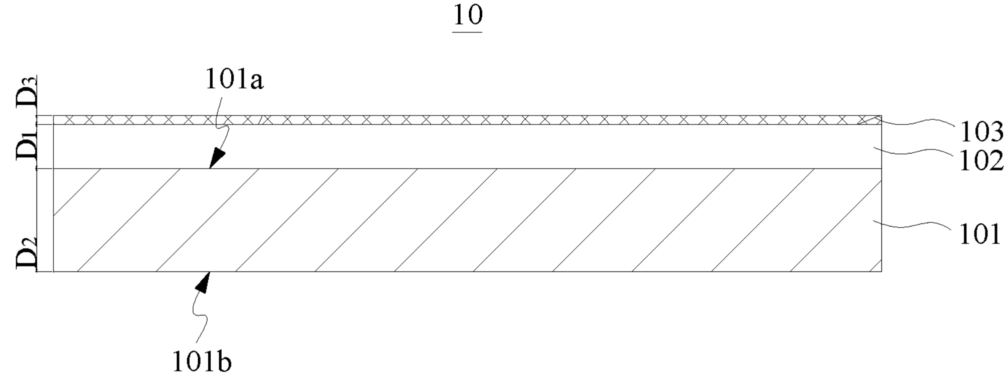
FIG. 3 is a schematic structural diagram of a negative electrode current collector according to another embodiment of the present application.
Figure 4:
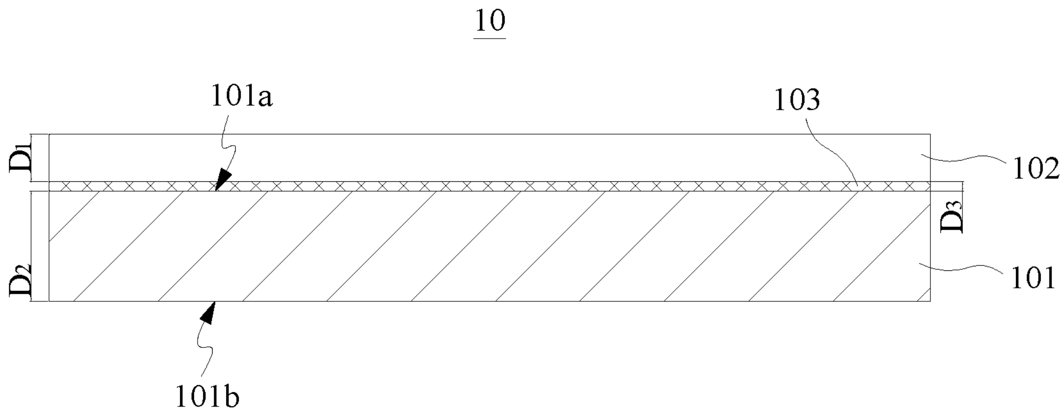
FIG. 4 is a schematic structural diagram of a negative electrode current collector according to another embodiment of the present application.
Figure 5:
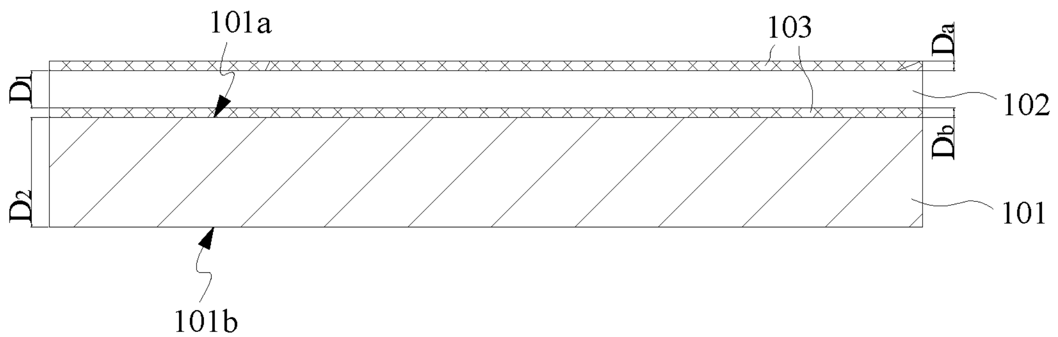
FIG. 5 is a schematic structural diagram of a negative electrode current collector according to another embodiment of the present application.

In some embodiments, the negative electrode current collector 10 further optionally includes a protective layer 103. Referring to FIGS. 3 to 5, the protective layer 103 may be disposed between the copper-based conductive layer 102 and the support layer 101. Alternatively, the protective layer 103 may be disposed on the surface of the copper-based conductive layer 102 away from the support layer 101. Alternatively, the protective layer 103 may be disposed between the copper-based conductive layer 102 and the support layer 101, and on the surface of the copper-based conductive layer 102 away from the support layer 101.

The protective layer 103 can protect the copper-based conductive layer 102, prevent the copper-based conductive layer 102 from chemical corrosion or mechanical damage, and ensure the working stability and service life of the negative electrode current collector 10, which is beneficial to enabling the electrochemical device to have relatively high safety performance and electrochemical performance. In addition, the protective layer 103 can also increase the strength of the negative electrode current collector 10.

It is understandable that, FIGS. 3 to 5 show the copper-based conductive layer 102 on a single side of the support layer 101, and the protective layer 103 on either or both of two opposite surfaces of the copper-based conductive layer 102 in its thickness direction. However, in other embodiments, the copper-based conductive layer 102 may be respectively disposed on two opposite surfaces of the support layer 101, the protective layer 103 may be disposed on either or both of two opposite surfaces of either copper-based conductive layer 102 in its thickness direction, and the protective layer 103 may also be disposed on either or both of two opposite surfaces of two copper-based conductive layers 102 in their thickness direction.

In some embodiments, the protective layer 103 may include one or more of metal, metal oxide, and conductive carbon.

The metal may include one or more of nickel, chromium, nickel-based alloy, and copper-based alloy. The nickel-based alloy is an alloy formed by adding one or more other elements to pure nickel as a matrix, and is preferably a nickel-chromium alloy. The nickel-chromium alloy is an alloy formed of metallic nickel and metallic chromium. Optionally, a weight ratio of nickel to chromium in the nickel-chromium alloy is from 1:99 to 99:1, such as 9:1. The copper-based alloy is an alloy formed by adding one or more other elements to pure copper as a matrix, and is preferably a nickel-copper alloy. Optionally, a weight ratio of nickel to copper in the nickel-copper alloy is from 1:99 to 99:1, such as 9:1.

The metal oxide may include one or more of aluminum oxide, cobalt oxide, chromium oxide, and nickel oxide.

The conductive carbon may include one or more of graphite, superconducting carbon, acetylene black, carbon black, Ketjen black, carbon dots, carbon nanotubes, graphene and carbon nanofibers, and further include one or more of carbon black, carbon nanotubes, acetylene black, and graphene.

In some embodiments, the protective layer 103 may include one or more of nickel, chromium, nickel-based alloy, copper-based alloy, aluminum oxide, cobalt oxide, chromium oxide, nickel oxide, graphite, superconducting carbon, acetylene black, carbon black, Ketjen black, carbon dots, carbon nanotubes, graphene, and carbon nanofibers.

As an example, referring to FIG. 3, the negative electrode current collector 10 includes a support layer 101, a copper-based conductive layer 102 and a protective layer 103 that are laminated. The support layer 101 has a first surface 101*a* and a second surface 101*b* opposite in its thickness direction, the copper-based conductive layer 102 is laminated on at least one of the first surface 101*a* and the second surface 101*b* of the support layer 101, and the protective layer 103 is laminated on a surface of the copper-based conductive layer 102 facing away from the support layer 101.

The protective layer 103 disposed on the surface of the copper-based conductive layer 102 facing away from the support layer 101 (referred to as an upper protective layer for short) protects the copper-based conductive layer 102 from chemical corrosion and mechanical damage. In particular, the upper protective layer can also improve the interface between the negative electrode current collector 10 and the negative electrode active material layer 20 and improve the bonding force between the negative electrode current collector 10 and the negative electrode active material layer 20.

In some embodiments, the upper protective layer of the negative electrode current collector 10 may be a metal oxide protective layer, for example, including aluminum oxide, cobalt oxide, nickel oxide, chromium oxide, etc. The metal oxide protective layer has high hardness and mechanical strength, a larger specific surface area, and better corrosion resistance, and can better protect the copper-based conductive layer 102.

The upper protective layer of the negative electrode current collector 10 is preferably a metal protective layer. The metal protective layer can improve the electrical conductivity of the negative electrode current collector 10, which can reduce polarization of the electrochemical device and reduce the risk of lithium precipitation from the negative electrode, thereby improving the cycle performance and safety performance of the electrochemical device. The upper protective layer of the negative electrode current collector 10 is more preferably a double protective layer, that is, a composite layer formed by a metal protective layer and a metal oxide protective layer. Preferably, the metal protective layer is disposed on the surface of the copper-based conductive layer 102 facing away from the support layer 101, and the metal oxide protective layer is disposed on the surface of the metal protective layer facing away from the support layer 101. This can improve the electrical conductivity and corrosion resistance of the negative electrode current collector 10 and the interface between the copper-based conductive layer 102 and the negative electrode active material layer 20, and thus can obtain a negative electrode current collector with better comprehensive performance.

As some other examples, referring to FIG. 4, the negative electrode current collector 10 includes a support layer 101, a copper-based conductive layer 102 and a protective layer 103 that are laminated. The support layer 101 has a first surface 101*a* and a second surface 101*b* opposite in its thickness direction, the copper-based conductive layer 102 is disposed on at least one of the first surface 101*a* and the second surface 101*b* of the support layer 101, and the protective layer 103 is disposed between the copper-based conductive layer 102 and the support layer 101.

The protective layer 103 disposed between the copper-based conductive layer 102 and the support layer 101 (referred to as a lower protective layer for short) protects the copper-based conductive layer 102 from chemical corrosion and mechanical damage. Meanwhile, the lower protective layer can also improve the bonding force between the copper-based conductive layer 102 and the support layer 101, and prevent the copper-based conductive layer 102 from separating from the support layer 101, thereby improving the supporting and protecting effect on the copper-based conductive layer 102.

Optionally, the lower protective layer is a metal oxide or metal protective layer. The metal oxide protective layer has relatively high corrosion resistance and large specific surface area, which can further improve the interface bonding force between the copper-based conductive layer 102 and the support layer 101, so that the lower protective layer can better protect the copper-based conductive layer 102 to improve the performance of the electrochemical device. In addition, the metal oxide protective layer has higher hardness and better mechanical strength, which is more beneficial to improving the strength of the negative electrode current collector 10. The metal protective layer can protect the copper-based conductive layer 102 from chemical corrosion and mechanical damage, and improve the electrical conductivity of the negative electrode current collector 10, which can reduce polarization of the electrochemical device and reduce the risk of lithium precipitation from the negative electrode, thereby improving the cycle performance and safety performance of the electrochemical device. Therefore, the lower protective layer of the negative electrode current collector 10 is preferably a metal protective layer.

As still other examples, referring to FIG. 5, the negative electrode current collector 10 includes a support layer 101, a copper-based conductive layer 102 and a protective layer 103 that are laminated. The support layer 101 has a first surface 101*a* and a second surface 101*b* opposite in its thickness direction, the copper-based conductive layer 102 is laminated on at least one of the first surface 101*a* and the second surface 101*b* of the support layer 101, and the protective layer 103 is disposed between the copper-based conductive layer 102 and the support layer 101 and on the surface of the copper-based conductive layer 102 away from the support layer 101.

The protective layer 103 is disposed on both surfaces of the copper-based conductive layer 102 to more fully protect the copper-based conductive layer 102, so that the negative electrode current collector 10 has relatively high comprehensive performance.

It is understandable that the protective layers 103 on the two surfaces of the copper-based conductive layer 102 may be made of the same or different materials, and may have the same or different thicknesses.

In some embodiments, the thickness $D_3$ of the protective layer 103 satisfies 1 nm≤$D_3$≤200 nm, and $D_3$≤0.1 $D_1$. In this way, while the copper-based conductive layer 102 is protected, the electrochemical device has relatively high energy density.

For example, the thickness $D_3$ of the protective layer 103 may be ≤200 nm, ≤180 nm, ≤150 nm, ≤120 nm, ≤100 nm, ≤80 nm, ≤60 nm, ≤55 nm, ≤50 nm, ≤45 nm, ≤40 nm, ≤30 nm or ≤20 nm, and further may be ≥1 nm, ≥2 nm, ≥5 nm, ≥8 nm, ≥10 nm, ≥12 nm, ≥15 nm or ≥18 nm. Preferably, 5 nm≤$D_3$≤200 nm. More preferably, 10 nm≤$D_3$≤200 nm.

The "thickness $D_3$ of the protective layer 103" refers to the thickness of the protective layer 103 on a single side of the copper-based conductive layer 102. That is, when the negative electrode current collector 10 includes the upper protective layer, the thickness $D_a$ of the upper protective layer is 1 nm≤$D_a$≤200 nm and $D_a$≤0.1$D_1$; further, 5 nm≤$D_a$≤200 nm; and furthermore, 10 nm≤$D_a$≤200 nm. When the negative electrode current collector 10 includes the lower protective layer, the thickness $D_b$ of the lower protective layer is 1 nm≤$D_b$≤200 nm and $D_b$≤0.1D1; further, 5 nm≤$D_b$≤200 nm; and furthermore, 10 nm≤$D_b$≤200 nm.

$D_a$ and $D_b$ are suitable for enabling the protective layer 103 to effectively protect the copper-based conductive layer 102 and meanwhile ensuring that the electrochemical device has relatively high energy density.

When the protective layer 103 is disposed on the two surfaces of the copper-based conductive layer 102, that is, when the negative electrode current collector 10 includes the upper protective layer and the lower protective layer, preferably, $D_a$>$D_b$. In this way, the upper protective layer and the lower protective layer cooperatively protect the copper-based conductive layer 102 from chemical corrosion and mechanical damage, and enable the electrochemical device to have relatively high energy density. More preferably, 0.5 $D_a$≤$D_b$≤0.8 $D_a$. Thus, the cooperative protection effect of the upper protective layer and the lower protective layer can be better exerted.

It can be understood that the influence of the setting of the protective layer 103 on the brittleness parameter C of the negative electrode current collector 10 is negligible.

The copper-based conductive layer 102 can be formed on the support layer 101 by at least one means of mechanical rolling, bonding, vapor deposition, chemical plating, and electroplating. Among them, vapor deposition and electroplating are preferred, that is, the copper-based conductive layer 102 is a vapor deposition layer or an electroplating layer. The copper-based conductive layer 102 is formed on the support layer 101 by means of vapor deposition or electroplating, which enables relatively high bonding force between the copper-based conductive layer 102 and the support layer 101, thereby improving the performance of the negative electrode current collector 10.

The vapor deposition is preferably physical vapor deposition. The physical vapor deposition is preferably at least one of evaporation and sputtering, wherein the evaporation is preferably at least one of vacuum evaporation, thermal evaporation and electron beam evaporation, and the sputtering is preferably magnetron sputtering.

As an example, the copper-based conductive layer 102 can be formed by vacuum evaporation. The vacuum evaporation may include: the support layer 101 after surface cleaning treatment is placed in a vacuum evaporation chamber, a metal wire in the metal evaporation chamber is melted and evaporated at a high temperature from 1300° C. to 2000° C., and the evaporated metal passes through a cooling system in the vacuum evaporation chamber and is finally deposited on the support layer 101 to form the copper-based conductive layer 102.

When the protective layer 103 exists, the protective layer 103 can be formed on the copper-based conductive layer 102 by at least one of vapor deposition, in-situ formation and coating. The vapor deposition may be the aforementioned vapor deposition. The in-situ formation is preferably in-situ passivation, that is, a method of forming a metal oxide passivation layer in situ on a metal surface. The coating is preferably at least one of roll coating, extrusion coating, knife coating, and gravure coating.

Preferably, the protective layer 103 is formed on the copper-based conductive layer 102 by at least one means of vapor deposition and in-situ formation. This enables relatively high bonding force between the copper-based conductive layer 102 and the protective layer 103, thereby better protecting the negative electrode current collector 10 by the protective layer 102 and ensuring good working performance of the negative electrode current collector 10.

When the protective layer 103 (that is, the lower protective layer) is disposed between the copper-based conductive layer 102 and the support layer 101, the lower protective layer may be formed on the support layer 101 first, and then the copper-based conductive layer 102 is formed on the lower protective layer. The lower protective layer may be formed on the support layer 101 by at least one means of vapor deposition and coating, and preferably by vapor deposition. The copper-based conductive layer 102 may be formed on the lower protective layer by at least one means of mechanical rolling, bonding, vapor deposition and chemical plating, and preferably by vapor deposition.

Negative Electrode Plate

The second aspect of the present application provides a negative electrode plate. The negative electrode plate includes a negative electrode current collector and a negative electrode active material layer that are laminated, wherein the negative electrode current collector is any negative electrode current collector 10 according to the first aspect of the present application.

Since the negative electrode plate of the present application adopts the negative electrode current collector 10 according to the first aspect of the present application, it has relatively high mechanics, relatively high preparation yield, relatively high use safety and reliability, low weight and relatively high electrochemical performance.

Figure 6:
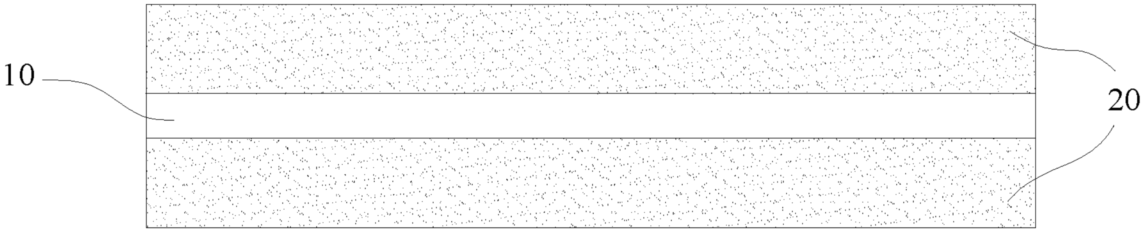
FIG. 6 is a schematic structural diagram of a negative electrode plate according to an embodiment of the present application.

FIG. 6 shows a negative electrode plate 30 as an example. Referring to FIG. 6, the negative electrode plate 30 includes a negative electrode current collector 10 and negative electrode active material layers 20 that are laminated, the negative electrode current collector 10 has two opposite surfaces in its thickness direction, and the negative electrode active material layers 20 are laminated on the two surfaces of the negative electrode current collector 10. It can be understood that the negative electrode active material layer 20 may also be laminated on either of the two surfaces of the negative electrode current collector 10.

The negative electrode active material layer 20 may adopt a negative electrode active material known in the art that can achieve reversible intercalation/deintercalation of active ions, which is not limited in this application. For example, the negative electrode active material for lithium-ion secondary batteries may include one or more of metallic lithium, natural graphite, artificial graphite, mesocarbon microbeads (MCMB), hard carbon, soft carbon, silicon, silicon-carbon composite, SiO, Li—Sn alloy, Li—Sn—O alloy, Sn, SnO, $SnO_2$, lithium titanate of a spinel structure, and Li—Al alloy.

In some embodiments, the negative electrode active material layer 20 may further include a conductive agent. This application does not limit the type of the conductive agent. As an example, the conductive agent may be selected from one or more of graphite, superconducting carbon, acetylene black, carbon black, Ketjen black, carbon dots, carbon nanotubes, graphene, and carbon nanofibers.

In some embodiments, the negative electrode active material layer 20 may further include a binder. This application does not limit the type of the binder. As an example, the binder may be selected from one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

The negative electrode plate 30 can be prepared according to a conventional method in the art, such as a coating method. As an example, the negative electrode active material and optional conductive agent and binder are dispersed in a solvent which may be NMP or deionized water to form a uniform negative electrode slurry; the negative electrode slurry is coated on the negative electrode current collector 10, and the negative electrode plate 30 is obtained after steps including drying and the like.

Electrochemical Device

The third aspect of the present application provides an electrochemical device. The electrochemical device includes a positive electrode plate, a negative electrode plate and an electrolyte, wherein the negative electrode plate is any negative electrode plate according to the second aspect of the present application.

Examples of the electrochemical device may be a battery, a battery module including the battery, and a battery pack including the battery. Examples of the battery may be a primary battery and a secondary battery. Specific examples include, but are not limited to, a lithium-ion secondary battery, a lithium primary battery, a sodium ion battery, a magnesium ion battery, etc.

The electrochemical device of the present application adopts the negative electrode plate provided according to the second aspect of the present application, and therefore has relatively high comprehensive electrochemical performance, including relatively high energy density, rate performance, cycle performance and safety performance.

In some embodiments, the positive electrode plate includes a positive electrode current collector and a positive electrode active material layer disposed on the positive electrode current collector. For example, the positive electrode current collector has two opposite surfaces in its thickness direction, and the positive electrode active material layer is laminated on either or both of the two surfaces.

The positive electrode active material layer may adopt a positive electrode active material known in the art that can achieve reversible intercalation/deintercalation of active ions, which is not limited in this application. For example, the positive electrode active material for lithium-ion secondary batteries may include one or more of lithium transition metal composite oxides, and composite oxides obtained by adding other transition metals or non-transition metals or non-metals to lithium transition metal composite oxides. The transition metals may be one or more of Mn, Fe, Ni, Co, Cr, Ti, Zn, V, Al, Zr, Ce, and Mg.

As an example, the positive electrode active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, and lithium-containing phosphate of an olivine structure. For example, the positive electrode active material includes one or more of $LiMn_2O_4$, $LiNiO_2$, $LiCoO_2$, $LiNi_{1-y}Co_yO_2$ ($0<y<1$), $LiNi_aCo_bAl_{1-a-b}O_2$ ($0<a<1$, $0<b<1$, $0<a+b<1$), $LiMn_{1-m-n}Ni_mCo_nO_2$ ($0<m<1$, $0<n<1$, $0<m+n<1$), $LiMPO_4$ (M may be one or more of Fe, Mn, and Co), and $Li_3V_2(PO_4)_3$.

In some embodiments, the positive electrode active material layer may further include a binder. This application does not limit the type of the binder. As an example, the binder may be selected from one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

In some embodiments, the positive electrode active material layer may further include a conductive agent. This application does not limit the type of the conductive agent. As an example, the conductive agent may be selected from one or more of graphite, superconducting carbon, acetylene black, carbon black, Ketjen black, carbon dots, carbon nanotubes, graphene, and carbon nanofibers.

The positive electrode plate can be prepared according to a conventional method in the art, such as a coating method. As an example, the positive electrode active material and optional conductive agent and binder are dispersed in a solvent which may be N-methylpyrrolidone (NMP) to form a uniform positive electrode slurry; the positive electrode slurry is coated on the positive electrode current collector, and the positive electrode plate is obtained after steps including drying and the like.

The positive electrode current collector may include one or more of aluminum, aluminum alloy, nickel, nickel alloy, titanium and silver, for example, one or more of aluminum and aluminum alloy. Mass percentage content of an aluminum element in the aluminum alloy is preferably 80 wt % or more, and more preferably 90 wt % or more.

In some embodiments, the electrolyte may be a solid electrolyte or a non-aqueous electrolyte. The non-aqueous electrolyte may be obtained by dispersing an electrolyte salt in an organic solvent to form an electrolyte. In the electrolyte, the organic solvent serves as a medium to transport ions in electrochemical reaction, and may adopt any organic solvent in the art. As a source of ions, the electrolyte salt may be any electrolyte salt in the art.

For example, the organic solvent for lithium-ion secondary batteries may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

For example, the electrolyte salt for lithium-ion secondary batteries may include one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

The electrolyte may further optionally include additives. The type of additives is not specifically limited, and may be selected according to requirements. For example, the additives may include negative electrode film-forming additives, positive electrode film-forming additives, and additives that can improve some performances of the electrochemical device, such as additives that improve overcharge performance of the electrochemical device, additives that improve high-temperature performance of the electrochemical device, and additives that improve low-temperature performance of the electrochemical device.

As an example, the additives may include one or more of vinylene carbonate (VC), vinyl ethylene carbonate (VEC), fluoroethylene carbonate (FEC), succinonitrile (SN), adiponitrile (ADN), 1,3-propylene sultone (PST), tris(trimethylsilane) phosphate (TMSP), and tris(trimethylsilane) borate (TMSB).

When the electrochemical device adopts the electrolyte, a separator is disposed between the positive electrode plate and the negative electrode plate for separation. The type of separator is not specially limited, and the separator may be any known porous separator with good chemical and mechanical stability, such as one or more of glass fiber, non-woven fabric, polyethylene, polypropylene, and polyvinylidene fluoride. The separator may be a single-layer film or a multi-layer composite film. When the separator is a multi-layer composite film, materials of respective layers may be the same or different.

In some embodiments, the electrochemical device may be a battery. The battery may include an outer package for packaging the positive electrode plate, the negative electrode plate, and the electrolyte. As an example, the positive electrode plate, the negative electrode plate and the separator can be laminated or wound to form an electrode assembly of a laminated structure or an electrode assembly of a wound structure, and the electrode assembly is packaged in the outer package; the electrolyte may adopt liquid electrolyte, and the liquid electrolyte infiltrates the electrode assembly. The battery may include one or several electrode assemblies, which can be adjusted according to requirements.

In some embodiments, the outer package of the battery may be a soft package, such as a soft bag. The material of the soft bag may be plastic, for example, it may include one or more of polypropylene (PP), polybutylene terephthalate (PBT), polybutylene succinate (PBS), etc. The outer package of the battery may also be a hard shell, such as an aluminum shell.

Figure 7:
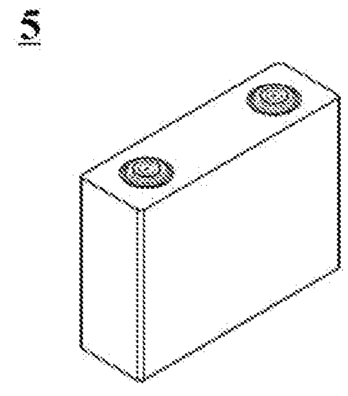
FIG. 7 is a schematic diagram of a battery according to an embodiment of the present application.

The present application does not have particular limitations to the shape of the battery. The battery may be cylindrical, square, or in other arbitrary shape. FIG. 7 shows a battery 5 of a square structure as an example.

In some embodiments, the batteries may be assembled into a battery module, the battery module may include a plurality of batteries, and the specific number can be adjusted according to the application and capacity of the battery module.

Figure 8:
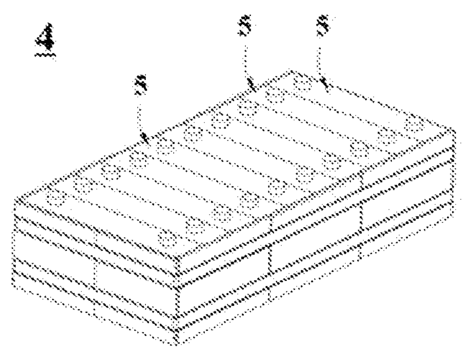
FIG. 8 is a schematic diagram of a battery module according to an embodiment of the present application.

FIG. 8 shows a battery module 4 as an example. Referring to FIG. 8, in the battery module 4, the plurality of batteries 5 may be arranged sequentially in a length direction of the battery module 4. Apparently, they may also be arranged in any other way. Further, the plurality of batteries 5 can be fixed by fasteners.

The battery module 4 may further optionally include a housing with a receiving space, and the plurality of batteries 5 are received in the receiving space.

In some embodiments, the above-mentioned battery module may also be assembled into a battery pack, and the number of battery modules included in the battery pack can be adjusted according to the application and capacity of the battery pack.

Figure 9:
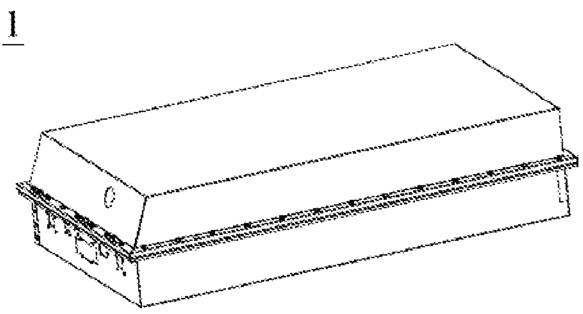
FIG. 9 is a schematic diagram of a battery pack according to an embodiment of the present application.
Figure 10:
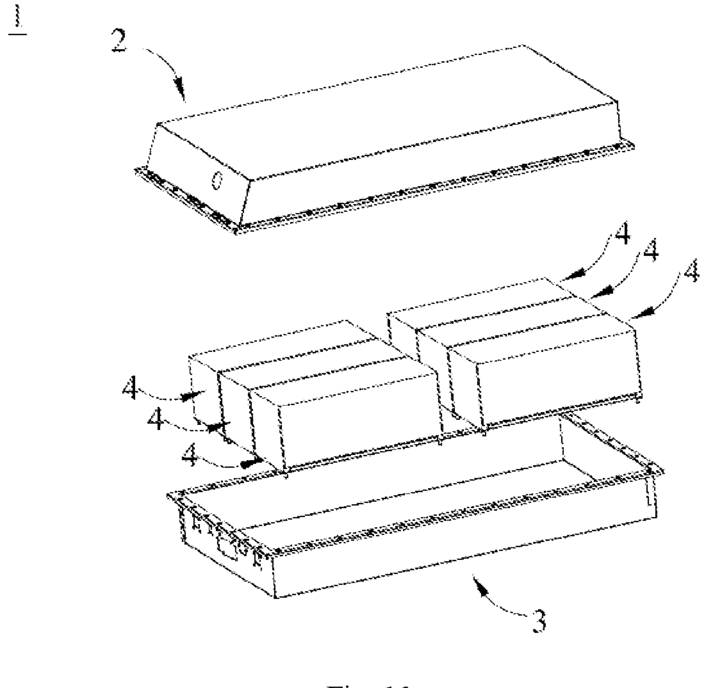
FIG. 10 is an exploded view of FIG. 9.

FIGS. 9 and 10 show a battery pack 1 as an example. Referring to FIGS. 9 and 10, the battery pack 1 may include a battery box and a plurality of battery modules 4 disposed in the battery box. The battery box includes an upper battery box 2 and a lower battery box 3. The upper battery box 2 can cover the lower battery box 3 to form a closed space for receiving the battery modules 4. A plurality of battery modules 4 can be arranged in the battery box in any manner.

Apparatus

The fourth aspect of the present application provides an apparatus. The apparatus includes the electrochemical device according to the third aspect of the present application. The electrochemical device can be used as a power source of the apparatus, and can also be used as an energy storage unit of the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc. The apparatus may select different electrochemical devices, such as batteries, battery modules or battery packs, according to its usage requirements.

Figure 11:
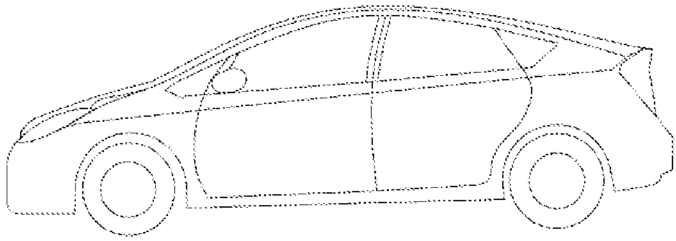
FIG. 11 is a schematic diagram of an apparatus according to an embodiment of the present application.

FIG. 11 shows an apparatus as an example. The apparatus is a pure electric vehicle, a hybrid electric vehicle, or a plug-in hybrid electric vehicle. In order to meet the requirements of the apparatus for high power and high energy density of electrochemical devices, the battery pack or battery module can be used.

As another example, the apparatus may be a mobile phone, a tablet computer, a notebook computer, etc. The apparatus is generally required to be thin and light, and the secondary battery can be used as a power source.

Some exemplary embodiments of the present application are provided as follows.

Embodiment 1. A negative electrode current collector, comprising a polymer material-based support layer and a copper-based conductive layer disposed on at least one surface of the support layer, wherein a thickness $D_1$ of the copper-based conductive layer, a tensile strength T of the support layer, and a thickness $D_2$ of the support layer satisfy a relational formula 1, $$0.01 \leq (300 \times D_1)/(T \times D_2) \leq 0.5 \qquad \text{formula 1}$$

in the formula 1, $D_1$ and $D_2$ are in the same unit, and T is in MPa.

Embodiment 2. The negative electrode current collector according to embodiment 1, wherein the thickness $D_1$ of the copper-based conductive layer, the tensile strength T of the support layer, and the thickness $D_2$ of the support layer satisfy a relational formula 1.1, $$0.01 \leq (300 \times D_1)/(T \times D_2) \leq 0.3. \qquad \text{formula 1.1}$$

Embodiment 3. The negative electrode current collector according to embodiment 1 or 2, wherein the tensile strength T of the support layer satisfies 100 MPa≤T≤400 MPa, and preferably 150 MPa≤T≤300 MPa.

Embodiment 4. The negative electrode current collector according to embodiment 1 or 2, wherein the support layer has a Young's modulus E≥2 GPa, and preferably 2 GPa≤E≤20 GPa.

Embodiment 5. The negative electrode current collector according to any one of embodiments 1 to 4, wherein the thickness $D_1$ of the copper-based conductive layer satisfies 30 nm≤$D_1$≤3 μm, preferably 300 nm≤$D_1$≤2 μm, preferably 500 nm≤$D_1$≤1.5 μm, and more preferably 800 nm≤$D_1$≤1.2 μm; and/or, the thickness $D_2$ of the support layer satisfies 1 μm≤$D_2$≤30 μm, preferably 1 μm≤$D_2$≤20 μm, preferably 1 μm≤$D_2$≤15 μm, preferably 2 μm≤$D_2$≤10 μm, preferably 2 μm≤$D_2$≤8 μm, and more preferably 2 μm≤$D_2$≤6 μm.

Embodiment 6. The negative electrode current collector according to any one of embodiments 1 to 5, wherein the copper-based conductive layer comprises one or more of copper and copper alloy, and mass percentage content of copper element in the copper alloy is preferably 80 wt % or more, and 90 wt % or more.

Embodiment 7. The negative electrode current collector according to any one of embodiments 1 to 6, wherein the copper-based conductive layer is a vapor deposited layer or an electroplated layer.

Embodiment 8. The negative electrode current collector according to any one of embodiments 1 to 7, wherein the support layer comprises one or more of polymer materials, and the polymer materials are selected from one or more of polyamide, polyimide, polyethylene terephthalate, polybutylene terephthalate, polyethylene naphthalate, polycarbonate, polyethylene, polypropylene, poly(propylene-co-ethylene), acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene ether, polyphenylene sulfide, polyethylene glycol, polysulfur nitride, polyphenylene, polypyrrole, polyaniline, polythiophene, polypyridine, cellulose, starch, protein, epoxy resin, phenol resin, derivatives thereof, cross linkers thereof, and copolymers thereof.

Embodiment 9. The negative electrode current collector according to any one of embodiments 1 to 8, wherein the support layer further comprises an additive, and the additive comprises one or more of metallic materials and inorganic non-metallic materials.

Embodiment 10. The negative electrode current collector according to any one of embodiments 1 to 9, wherein the negative electrode current collector further comprising a protective layer; and the protective layer is disposed between the copper-based conductive layer and the support layer, and/or, the protective layer is disposed on a surface of the copper-based conductive layer away from the support layer.

Embodiment 11. The negative electrode current collector according to embodiment 10, wherein the protective layer comprises one or more of metals, metal oxides and conductive carbon, and preferably comprises one or more of nickel, chromium, nickel-based alloy, copper-based alloy, alumina, cobalt oxide, chromium oxide, nickel oxide, graphite, superconducting carbon, acetylene black, carbon black, Ketjen black, carbon dots, carbon nanotubes, graphene, and carbon nanofibers.

Embodiment 12. The negative electrode current collector according to embodiment 10 or 11, wherein a thickness $D_3$ of the protective layer satisfies 1 nm≤$D_3$≤200 nm, and $D_3$≤0.1 $D_1$.

Embodiment 13. A negative electrode plate, comprising a negative electrode current collector and a negative active material layer disposed on the negative electrode current collector, wherein the negative electrode current collector is the negative electrode current collector according to any one of embodiments 1 to 12.

Embodiment 14. An electrochemical device, comprising a positive electrode plate, a negative electrode plate and an electrolyte, wherein the negative electrode plate is the negative electrode plate according to embodiment 13.

Embodiment 15. An apparatus, comprising the electrochemical device according to embodiment 14.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Preparation Methods

Preparation of Negative Electrode Current Collector

A polymer material-based support layer with a predetermined thickness was selected and subjected to surface cleaning treatment, the support layer after the surface cleaning treatment was placed in a vacuum evaporation chamber, a high-purity copper wire in the metal evaporation chamber was melted and evaporated at a high temperature from 1300° C. to 2000° C., and the evaporated metal passed through a cooling system in the vacuum evaporation chamber and was finally deposited on two surfaces of the support layer to form copper-based conductive layers.

Preparation of Conventional Negative Electrode Current Collector

A copper foil with a thickness of 8 μm was used.

Preparation of Negative Electrode Plate

Negative electrode active materials including graphite, conductive carbon black, sodium carboxymethyl cellulose as a thickener, and styrene butadiene rubber emulsion as a binder were mixed thoroughly at a weight ratio of 96.5:1.0:1.0:1.5 in an appropriate amount of deionized water to form a uniform negative electrode slurry; the negative electrode slurry was coated on a negative electrode current collector, and a negative electrode plate was obtained after steps including drying and the like.

Preparation of Conventional Positive Electrode Current Collector

An aluminum foil with a thickness of 12 μm was used.

Preparation of Conventional Positive Electrode Plate

Positive electrode active materials including $LiNi_{1/3}Co_{1/3}Mn_{1/3}O_2$, conductive carbon black, and polyvinylidene fluoride (PVDF) as a binder were mixed thoroughly at a weight ratio of 93:2:5 in an appropriate amount of N-methylpyrrolidone (NMP) solvent to form a uniform positive electrode slurry; the positive electrode slurry was coated on a positive electrode current collector, and a positive electrode plate was obtained after steps including drying and the like.

Preparation of Electrolyte

Ethylene carbonate (EC) and ethyl methyl carbonate (EMC) at a volume ratio of 3:7 were mixed uniformly to obtain an organic solvent, and then 1 mol/L $LiPF_6$ was uniformly dissolved in the organic solvent.

Preparation of Lithium-Ion Secondary Battery

The positive electrode plate, the separator which was a PP/PE/PP composite film, and the negative electrode plate were laminated in sequence and then wound into an electrode assembly, and the electrode assembly was packaged into a packaging housing, injected with the electrolyte and sealed to obtain a lithium-ion secondary battery.

Test Section

1. Test of the Negative Electrode Current Collector

1) Test of Brittleness Parameter C of the Negative Electrode Current Collector

The support layer was cut into a sample with a width of 15 mm and a length of 150 mm which was then loaded into an upper clamp and a lower clamp of American INSTRON 3365 universal tensile tester with an initial length set to 50 mm, and then a tensile test was performed at a tensile rate of 5 mm/min until the sample broke; maximum tensile force F borne when the sample broke was recorded, and a tensile strength T of the support layer was calculated according to T=F/S. S was initial cross-sectional area of the sample, which was equal to the product of the width and thickness of the sample (i.e., the thickness $D_2$ of the support layer).

The thickness $D_1$ of the copper-based conductive layer and the thickness $D_2$ of the support layer were measured by a ten-thousandth micrometer.

The brittleness parameter C of the negative electrode current collector=(300×the thickness $D_1$ of the copper-based conductive layer)/(the tensile strength T of the support layer×the thickness $D_2$ of the support layer).

2) Test of Elongation at Break of the Negative Electrode Current Collector

The negative electrode current collector was cut into a sample of 15 mm×200 mm, a tensile test was performed by means of American INSTRON 3365 universal tensile tester at normal temperature and pressure (25° C., 0.1 MPa), an initial position was set such that the sample between the clamps was 50 mm long, the sample was stretched at a speed of 5 mm/min, device displacement y (mm) at tensile break was recorded, and finally the elongation at break was calculated as (y/50)×100%.

2. Performance Test of the Battery (1) Cycle Performance Test

At 45° C., the lithium-ion secondary battery was charged to 4.2 V at a constant current rate of 1C and then charged at a constant voltage until the current was ≤0.05C, and afterwards discharged at a constant current rate of 1C to 2.8 V This was a charge-discharge cycle. The discharge capacity at this time was a discharge capacity of the first cycle. The lithium-ion secondary battery was subjected to 1000 charge-discharge cycles according to the above method, the discharge capacity of the 1000th cycle was recorded, and a capacity retention rate of the lithium-ion secondary battery after 1000 cycles at 1C/1C was calculated.

Capacity retention rate of lithium-ion secondary battery at 45° C. after 1000 cycles at 1C/1C (%)=the discharge capacity at the 1000th cycle/the discharge capacity at the first cycle×100%

(2) Rate Performance Test

At 25° C., the lithium-ion secondary battery was charged to 4.2 V at a constant current rate of 1C, then charged at a constant voltage until the current was less than or equal to 0.05C, and discharged to 3.0 V at the constant current rate of 1C, and a 1C rate discharge capacity of the lithium-ion secondary battery was obtained by testing.

At 25° C., the lithium-ion secondary battery was charged to 4.2 V at the constant current rate of 1C, then charged at a constant voltage until the current was less than or equal to 0.05C, and discharged to 3.0 V at a constant current rate of 4C, and a 4C rate discharge capacity of the lithium-ion secondary battery was obtained by testing.

A 4C rate capacity retention rate of the secondary battery (%)=the 4C rate discharge capacity/the 1C rate discharge capacity×100%

Test Results

1. Effect of the Negative Electrode Current Collector in Improving the Gravimetric Energy Density of the Electrochemical Device

TABLE 1

| Number of negative electrode current collector | Support layer | | Copper-based conductive layer | | Thickness of negative electrode current collector (μm) | Weight percentage of negative electrode current collector (%) |
|---|---|---|---|---|---|---|
| | Material | $D_2$ (μm) | Material | $D_1$ (μm) | | |
| Negative electrode current collector 1 | PET | 5 | Cu | 0.03 | 5.06 | 7 |
| Negative electrode current collector 2 | PET | 5 | Cu | 0.3 | 5.6 | 16 |
| Negative electrode current collector 3 | PET | 5 | Cu | 0.5 | 6 | 21.6 |
| Negative electrode current collector 4 | PET | 5 | Cu | 0.6 | 6.2 | 24.1 |
| Negative electrode current collector 5 | PI | 2 | Cu | 0.8 | 3.6 | 23.8 |
| Negative electrode current collector 6 | PET | 8 | Cu | 1 | 10 | 39.6 |
| Negative electrode current collector 7 | PET | 6 | Cu | 1.5 | 9 | 48.5 |
| Negative electrode current collector 8 | PET | 4 | Cu | 1.2 | 6.4 | 37.3 |
| Negative electrode current collector 9 | PET | 10 | Cu | 0.2 | 10.4 | 23.3 |
| Negative electrode current collector 10 | PI | 8 | Cu | 2 | 12 | 65.3 |
| Negative electrode current collector 11 | PET | 5 | Cu | 3 | 11 | 57.2 |
| Conventional negative electrode current collector | / | / | Cu | 8 | 8 | 100 |

In Table 1, the weight percentage of the negative electrode current collector was a percentage of the weight of the negative electrode current collector per unit area divided by the weight of the conventional negative electrode current collector per unit area. Compared with the existing copper foil negative electrode current collector, the weights of the negative electrode current collectors according to the present application were reduced to various degrees, so that gravimetric energy densities of electrochemical devices can be improved.

2. Effect of the Protective Layer on the Electrochemical Performance of the Negative Electrode Current Collector and the Electrochemical Device

TABLE 2-1

| Number of negative electrode current collector | Upper protective layer | | Lower protective layer | |
|---|---|---|---|---|
| | Material | $D_a$ (nm) | Material | $D_b$ (nm) |
| Negative electrode current collector 7-1 | / | / | Nickel | 1 |
| Negative electrode current collector 7-2 | / | / | Nickel | 10 |
| Negative electrode current collector 7-3 | / | / | Nickel-based alloy | 50 |
| Negative electrode current collector 7-4 | / | / | Nickel | 150 |
| Negative electrode current collector 7-5 | Nickel | 5 | / | / |
| Negative electrode current collector 7-6 | Nickel-based alloy | 100 | / | / |
| Negative electrode current collector 7-7 | Nickel | 10 | Nickel | 5 |
| Negative electrode current collector 7-8 | Nickel | 10 | Nickel | 10 |

TABLE 2-1-continued

| Number of negative electrode current collector | Upper protective layer | | Lower protective layer | |
|---|---|---|---|---|
| | Material | $D_a$ (nm) | Material | $D_b$ (nm) |
| Negative electrode current collector 7-9 | Nickel | 50 | Nickel | 50 |
| Negative electrode current collector 7-10 | Nickel | 100 | Nickel | 50 |
| Negative electrode current collector 7-11 | Nickel | 150 | Nickel | 75 |
| Negative electrode current collector 7-12 | Nickel oxide | 100 | Nickel oxide | 50 |
| Negative electrode current collector 7-13 | Nickel oxide | 100 | Nickel | 50 |
| Negative electrode current collector 7-14 | Double protective layers | 50 | Nickel | 50 |

The negative electrode current collectors in Table 2-1 were provided with a protective layer on the basis of the negative electrode current collector 7 in Table 1.

The nickel-based alloy in Table 2-1 contained: nickel, 90 wt %; and chromium, 10 wt %.

The double protective layers in Table 2-1 included a nickel protective layer disposed on the surface of the copper-based conductive layer facing away from the support layer, with a thickness of 25 nm; and a nickel oxide protective layer disposed on the surface of the nickel protective layer facing away from the support layer, with a thickness of 25 nm.

TABLE 2-2

| Number of battery | Negative electrode plate: Number of negative electrode plate | Negative electrode plate: Number of negative electrode current collector | Capacity retention rate at 45° C. after 1000 1 C/1 C cycles (%) | 4 C rate capacity retention rate (%) |
|---|---|---|---|---|
| Battery 2-1 | Negative electrode plate 7 | Negative electrode current collector 7 | 86.3 | 46.8 |
| Battery 2-2 | Negative electrode plate 7-1 | Negative electrode current collector 7-1 | 86.3 | 46.5 |
| Battery 2-3 | Negative electrode plate 7-2 | Negative electrode current collector 7-2 | 86.7 | 46.6 |
| Battery 2-4 | Negative electrode plate 7-3 | Negative electrode current collector 7-3 | 86.5 | 46.0 |
| Battery 2-5 | Negative electrode plate 7-4 | Negative electrode current collector 7-4 | 87.1 | 47.4 |
| Battery 2-6 | Negative electrode plate 7-5 | Negative electrode current collector 7-5 | 86.5 | 46.4 |
| Battery 2-7 | Negative electrode plate 7-6 | Negative electrode current collector 7-6 | 86.7 | 46.1 |
| Battery 2-8 | Negative electrode plate 7-7 | Negative electrode current collector 7-7 | 87.2 | 47.3 |
| Battery 2-9 | Negative electrode plate 7-8 | Negative electrode current collector 7-8 | 87.6 | 47.5 |
| Battery 2-10 | Negative electrode plate 7-9 | Negative electrode current collector 7-9 | 87.8 | 47.7 |
| Battery 2-11 | Negative electrode plate 7-10 | Negative electrode current collector 7-10 | 88.0 | 48.1 |
| Battery 2-12 | Negative electrode plate 7-11 | Negative electrode current collector 7-11 | 88.3 | 48.6 |
| Battery 2-13 | Negative electrode plate 7-12 | Negative electrode current collector 7-12 | 87.3 | 46.2 |
| Battery 2-14 | Negative electrode plate 7-13 | Negative electrode current collector 7-13 | 86.9 | 48.3 |
| Battery 2-15 | Negative electrode plate 7-14 | Negative electrode current collector 7-14 | 87.9 | 47.7 |
| Battery 2-16 | Conventional negative electrode plate | Conventional negative electrode current collector | 86.7 | 47.9 |

The batteries in Table 2-2 all adopted conventional positive electrode plates.

It can be seen from Table 2-2 that the cycle life and rate performance of the electrochemical device using the negative electrode current collector of the present application were good, and were equivalent to the cycle performance and rate performance of the electrochemical device using the conventional negative electrode current collector. This showed that the composite negative electrode current collector of the present application would not have a significant adverse effect on the electrochemical performance of the electrochemical device. Particularly, for the electrochemical device made of the composite negative electrode current collector provided with a protective layer, its capacity retention rate at 45° C. after 1000 1C/1C cycles and 4C rate capacity retention rate were further improved, indicating that the reliability of the electrochemical device was better.

3. Brittleness Parameter of the Negative Electrode Current Collector and its Influence on Mechanical Properties of the Negative Electrode Current Collector

TABLE 3

| Number of negative electrode current collector | Support layer: Material | Support layer: T (MPa) | Support layer: $D_2$ (μm) | Copper-based conductive layer: Material | Copper-based conductive layer: $D_1$ (μm) | Elongation at break (%) |
|---|---|---|---|---|---|---|
| Negative electrode current collector 1 | PET | 200 | 5 | Cu | 0.03 | 45 |
| Negative electrode current collector 2 | PET | 200 | 5 | Cu | 0.3 | 37 |
| Negative electrode current collector 3 | PET | 200 | 5 | Cu | 0.5 | 24 |
| Negative electrode current collector 4 | PET | 200 | 5 | Cu | 0.6 | 5.70 |
| Negative electrode current collector 5 | PI | 300 | 2 | Cu | 0.8 | 5.30 |
| Negative electrode current collector 6 | PET | 200 | 8 | Cu | 1 | 6.50 |
| Negative electrode current collector 7 | PET | 200 | 6 | Cu | 1.5 | 3.80 |
| Negative electrode current collector 8 | PET | 200 | 4 | Cu | 1.2 | 3.30 |

TABLE 3-continued

| Number of negative electrode current collector | Support layer | | | Copper-based conductive layer | | Elongation at break (%) |
|---|---|---|---|---|---|---|
| | Material | T (MPa) | $D_2$ (μm) | Material | $D_1$ (μm) | |
| Negative electrode current collector 9 | PET | 200 | 10 | Cu | 0.2 | 32 |
| Negative electrode current collector 10 | PI | 300 | 8 | Cu | 2 | 4.60 |
| Negative electrode current collector 11 | PET | 200 | 5 | Cu | 3 | 3.60 |
| Negative electrode current collector 12 | PET | 200 | 5 | Copper alloy | 0.6 | 5.5 |
| Negative electrode current collector 13 | PET | 200 | 5 | Copper alloy | 3 | 3.1 |
| Comparative negative electrode current collector | PET | 200 | 5 | Cu | 2 | 1.40 |

In Table 3, the copper alloy was CuNi alloy composed of 95 wt % Cu and 5 wt % Ni.

From the results in Table 3, it can be seen that the brittleness parameter C, from 0.01 to 0.5, of the negative electrode current collector increased the elongation at break of the negative electrode current collector, and the elongation at break of the negative electrode current collector was 3% or more. Therefore, the negative electrode current collector was ensured to have relatively high mechanics and mechanical properties, so that it can withstand certain deformation without breakage during the production and working process of the electrochemical device. This can improve the machining property of the negative electrode current collector and its stability during use, and effectively prevent it from breaking or cracking during preparation and use, thereby significantly improving yields of the negative electrode current collector and the negative electrode plate and electrochemical device using the same during preparation and their reliability during use.

Described above are merely specific embodiments of the present application, but the protection scope of the present application is not limited to thereto. Any modification, replacement, or other equivalent readily conceived by a skilled person in the art according to the disclosure of the present application shall fall within the protection scope of the present application. Therefore, the protection scope of the present application shall be subject to the protection scope of the claims.

What is claimed is:

1. A negative electrode current collector, comprising a polymer material-based support layer and a copper-based conductive layer disposed on at least one surface of the support layer, wherein a thickness $D_1$ of the copper-based conductive layer, a tensile strength T of the support layer, and a thickness $D_2$ of the support layer satisfy a relational formula 1, $$0.35 \leq (300\times D_1)/(T\times D_2) \leq 0.38 \quad \text{formula 1}$$

in the formula 1, $D_1$ and $D_2$ are in the same unit, and T is in MPa; and in case of the negative electrode current collector where the copper-based conductive layers are disposed on two opposite surfaces of the support layer, the "thickness $D_1$ of the copper-based conductive layer" refers to average thickness of the copper-based conductive layers on both sides of the support layer; and the tensile strength T of the support layer satisfies 200 MPa≤T≤300 MPa; and the thickness $D_2$ of the support layer satisfies 1 μm≤$D_2$≤20 μm, the thickness $D_1$ of the copper-based conductive layer satisfies 1 μm≤$D_1$≤2 μm, and the negative electrode current collector further comprising an upper protective layer and a lower protective layer, the upper protective layer has a thickness of denoted as $D_a$ and the lower protective layer has a thickness $D_b$, and $D_a$>$D_b$, and 100 nm≤$D_a$≤150 nm and 50 nm≤$D_b$≤75 nm; and the upper protective layer comprises one or more of nickel and nickel oxide and the lower protective layer comprises nickel oxidekel; and the lower protective layer is disposed between the copper-based conductive layer and the support layer, and, the upper protective layer is disposed on a surface of the copper-based conductive layer away from the support layer.

2. The negative electrode current collector according to claim 1, wherein the support layer has a Young's modulus E≥2 GPa.

3. The negative electrode current collector according to claim 1, wherein the thickness $D_1$ of the copper-based conductive layer satisfies 1 μm≤$D_1$≤1.2 μm; and/or, the thickness $D_2$ of the support layer satisfies 2 μm≤$D_2$≤6 μm.

4. The negative electrode current collector according to claim 1, wherein the copper-based conductive layer comprises one or more of copper and copper alloy.

5. The negative electrode current collector according to claim 4, wherein mass percentage content of copper element in the copper alloy is 80 wt % or more.

6. The negative electrode current collector according to claim 4, wherein mass percentage content of copper element in the copper alloy is 90 wt % or more.

7. The negative electrode current collector according to claim 1, wherein the copper-based conductive layer is a vapor deposited layer or an electroplated layer.

8. The negative electrode current collector according to claim 1, wherein the support layer comprises one or more of polymer materials, and the polymer materials are selected from one or more of polyamide, polyimide, polyethylene terephthalate, polybutylene terephthalate, polyethylene naphthalate, polycarbonate, polyethylene, polypropylene, poly(propylene-co-ethylene), acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene ether, polyphenylene sulfide, polyethylene glycol, polysulfur nitride, polyphenylene, polypyrrole, polyaniline, polythiophene, polypyridine, cellulose, starch, protein, epoxy resin, phenol resin, derivatives thereof, cross linkers thereof, and copolymers thereof.

9. The negative electrode current collector according to claim 1, wherein the support layer further comprises an additive, and the additive comprises one or more of metallic materials and inorganic non-metallic materials.

10. The negative electrode current collector according to claim 1, wherein the support layer has a Young's modulus of 2 GPa≤E≤20 GPa.

11. A negative electrode plate, comprising a negative electrode current collector and a negative active material layer disposed on the negative electrode current collector, wherein the negative electrode current collector is the negative electrode current collector according to claim 1.

12. An electrochemical device, comprising a positive electrode plate, a negative electrode plate and an electrolyte, wherein the negative electrode plate is the negative electrode plate according to claim 11.

13. An apparatus, comprising the electrochemical device according to claim 12.

* * * * *